United States Patent Office 3,706,687
Patented Dec. 19, 1972

3,706,687
URETHANE FOAM PRODUCTION AND CATALYST THEREFOR COMPRISING A MIXTURE OF AN ALIPHATIC TERTIARY AMINE COMPOUND AND A TERTIARY AMINE SALT OF AN ALKYL-ARYLSULFONIC ACID
Henryk S. Rudzki, Capo le Case 56, Rome, Italy
No Drawing. Continuation of application Ser. No. 788,842, Jan. 10, 1969, which is a continuation-in-part of abandoned application Ser. No. 715,554, Mar. 25, 1968, which in turn is a continuation-in-part of abandoned application Ser. No. 698,693, Jan. 18, 1968. This application Aug. 19, 1970, Ser. No. 65,347
Int. Cl. C08g 22/38
U.S. Cl. 260—2.5 AC
33 Claims

ABSTRACT OF THE DISCLOSURE

Production of polyurethane foams by reaction of at least one polyfunctional isocyanate compound with at least one polyfunctional compound containing an active hydrogen group in the presence of a novel catalyst composition comprising a particular mixture of at least one aliphatic amine and at least one alkylarylsulfonic acid which has been neutralized with a tertiary amine and also in the presence of a blowing agent for the reaction.

---

This application is a continuation of application Ser. No. 788,842, filed Jan. 10, 1969, entitled "Urethane Foam Production and Catalyst Therefor," now abandoned, which is a continuation-in-part of application Ser. No. 715,554, filed Mar. 25, 1968, entitled "Urethane Foam Production," now abandoned, which, in turn, is a continuation-in-part of application Ser. No. 698,693, filed Jan 18, 1968, entitled "Urethane Foam Production," now abandoned.

The present invention relates to production of cellular polyurethane foams having improved physical properties by conventional techniques using as the catalyst for the reaction a novel catalyst composition comprising a mixture of at least one aliphatic amine and at least one alkylarylsulfonic acid which has been neutralized with a tertiary amine, and to said novel catalyst composition.

Polyurethane foams are commonly employed in many different types of applications. They are commonly used as padding, pillows, mattresses, toy stuffings and the like. Because of certain inherent properties of such foams and their costs in many of such applications they are uniquely advantageous. The properties of these foams which make them desirable are related to a number of different, complex factors and considerations.

In a technical sense any polyurethane is a polymer reaction product of a polyfunctional isocyanate and polyfunctional compound containing an active hydrogen atom capable of reacting with an isocyanate group. Obviously, the number of different polyfunctional compounds which can be used in creating a polymer falling within the broad term "polyurethane" is almost unlimited. The properties of any such urethane polymer will be directly determined by the nature of the specific compounds used in creating the polymer.

For reasons which are relatively unimportant to this invention, practically all polyurethane polymers used in polyurethane foams are based upon 2,4-tolylenediisocyanate, although other diisocyanates, such as 4,4-benzidene-diisocyanate and 1,5-naphthylenediisocyanate are capable of being used in utilitarian polyurethane polymers. Commercial polyurethane polymers also utilize as the second polyfunctional compound various different polyesters and polyethers such as a polyester resulting from the reaction to ethylene glycol and adipic acid.

During the formation of a polyurethane polymer, the polyfunctional isocyanate and the other polyfunctional compound used are normally mixed so as to allow the isocyanate groups to react with the reactive hydrogen atoms on the other polyfunctional compound in order to create a urethane type of linkage, resulting in the formation of a urethane polymer. In the production of urethane foams, this technique is modified to a limited extent. Normally, the polymer composition is caused to expand as the polymer forming reactions transpire by adding to the mixture an excess of the isocyanate compound over the stoichiometric amount required and a small quantity of water.

During the polymer formation these two compounds will cause the generation of carbon dioxide gas which will, in turn, cause the entire composition to take on desired foam character as urethane polymer chains are formed. It is known to use various liquids which will volatilize during the polymer formation so as to accomplish the same results. Such use of water and an excess of isocyanate compound in the formation of a polyurethane foam is sometimes referred to as a "one-shot" process for foam generation.

This type of "one-shot" process involves a number of different, complex factors. When a difunctional isocyanate and a difunctional polyglycol or polyester are reacted, a linear type polymer chain results. In the production of polyurethane foams such linear type polymer chains tend to be cross-linked as a result of what can be considered secondary type reactions. The nitrogen in a urethane linkage carries an active hydrogen capable of reacting with an isocyanate radical during the formation of linear polyurethanes. Because of this, some reactions will take place adding isocyanate groups to a linear polyurethane polymer at urethane linkage sites. The chemical bond formed in this manner is termed an "allophonate" group or linkage. The reactive isocyanate group on a polyfunctional isocyanate remaining unreacted after such an allophonate is formed is of course available for further allophonate linkage formation, cross-linking polyurethane chains, or available to form urethane linkages.

When water is present in this type of system, it will react with isocyanate groups present either in the initial difunctional isocyanate compound or on side chains connected to polyurethane polymer chains by an allophonate linkage or group. This type of reaction will form amines and will result in the liberation of carbon dioxide. Any such amines formed of course possess active hydrogens which will tend to react with any nonreacted isocyanates present, forming urea type compounds. If such urea type compounds are fully reacted, so that all of the active hydrogens from the original amines have reacted with isocyanate groups, so-called "biuret" compounds are formed.

The properties of an ultimate polyurethane foam vary depending upon the extent of all of these reactions. In general, the greater the degree of the reaction leading to the formation of linear polymer chains, the more flexible the ultimate polyurethane foam. Similarly, in general the greater the degree of cross-linking relative to the lengths of polymer chains produced, the less the flexibility in the ultimate product. Both the linear polymer formation and cross-linking reactions are limited in a particular system by the rate at which the degree to which water reacts with isocyanate groups to produce carbon dioxide gas. If this gas forms too rapidly, some of it will escape, reducing the porosity of the final product and similarly the reactive isocyanate groups will be consumed in such a manner to impede and/or limit the formation of urethane linkages.

The ultimate properties of a polyurethane foam are dependent upon "balancing" all of these factors so as to obtain in the final product a degree of linear polymer formation and a degree of chain cross-linking with a desired retention of carbon dioxide gas in cells or pockets in the polymer system. The "balance" of these factors preferably is of such a nature that urethane linkages dominate over the other types of linkages in the complete polymer system. This is because in general the urethane linkages are considered to provide more desirable ultimate polymer properties than the other types of linkages indicated. As an example of this, it is known that urea and biuret linkages are more susceptible to hydrolysis than urethane and allophonate linkages. As a result of said susceptibility there is a tendency for so-called "one-shot" polyurethane foams to be comparatively unstable under heat and humidity conditions. Further, the hydrolysis products of urea and biuret linkages are disadvantageous because they tend to oxidize into colored products, discoloring a urethane foam.

In developing desired ultimate properties of polyurethane foam, it is necessary to take into consideration the fact that the degree of formation of different types of linkages in the polymer system is influenced by steric factors. As an example of this, the polyfunctional isocyanate in polyurethanes most commonly used is 2,4-tolylenediisocyanate. The functional groups on this compound differ in reactivity, particularly after one of them has been reacted. Because of this, the comparatively unreactive isocyanate group on this compound is considered to enter into the polymer system slowly, forming an amine which subsequently may react to form a urea or biuret. As a result of this and various other factors as are indicated in the preceding, it is considered necessary and desirable to carefully control the reactions in a "one-shot" polyurethane foam mixture so that what can be considered to be a proper proportion of different types of linkages are formed within this mixture at a rate which is related to the production of gas within the mixture.

Such control has been attempted through the use of a large number of different types of compound. Among such compounds are phosphines, inorganic acids, various types of amines and certain organometallic compounds. Because of color and toxicity problems, it is considered that only certain types of amines and certain types of alkyl tin compounds can be satisfactorily employed for this purpose. It is considered that most of such known catalysts are disadvantageous inasmuch as they tend to accelerate or catalyze certain reactions occurring during the formation of polyurethane foam to a greater degree than they accelerate or catalyze other reactions. Those catalysts which tend to promote or accelerate the principal types of reactions occurring in the formation of a polyurethane foam at a comparatively equal rate are considered disadvantageous from a purely cost standpoint.

An object of the present invention is to provide new and improved catalysts for use in so-called "one-shot" production of polyurethane foams which catalysts are significantly less expensive than prior related catalysts having the same or substantially the same type of effect. Another object of the present invention is to provide catalysts for this purpose which are relatively non-toxic, which are substantially unobjectionable from a color standpoint, and which are relatively disadvantageous from an odor standpoint. A further object of this invention is to provide catalysts for the intended purpose which may be easily and conveniently used in the "one-shot" production of polyurethane foam in the same manner as presently known catalysts for this purpose.

The invention is not, however, limited to a specific catalyst, but relates to the use of catalysts in what may be termed a "one-shot" process for the production of polyurethane foam. Thus, the invention may be considered essentially as a process invention pertaining to the use of a catalyst and/or catalyst system as hereinafter described.

The foregoing objects and others which will become apparent from the following description are accomplished in accordance with the present invention by catalyzing the reaction of an organic polyisocyanate with an organic compound having active hydrogen containing groups as determined by the Zerewitinoff method with a novel catalyst composition comprising a particular mixture of at least one aliphatic amine and at least one alkylarylsulfonic acid which has been neutralized with a tertiary amine.

The alkylarylsulfonic acid used as starting material in forming the alkylarylsulfonic acid tertiary amine salt which constitutes a portion of the catalyst employable herein, may be any conveniently available compound of this type. Compounds of this class are well known and are commonly used and sold as surfactants. These alkylarylsulfonic acids, in general, are alkyl-substituted aromatic compounds which may contain one or more alkyl substituents wherein the alkyl group, which may be a straight or branched chain, contains from about 9 to about 15 carbon atoms. The aromatic portion of these alkylarylsulfonic acids may be monocyclic or polycyclic, i.e. may correspond to aromatic structures of conventional alkylarylsulfonic acid surfactant compositions. It has been found that if the alkyl chain is too short, the resultant neutralized alkyl aromatic sulfonic compound will not possess the surface active type properties to a degree which renders the same essential for use in accordance with the present invention. Conversely, if the alkyl chain of the alkyl aromatic compound is abnormally long, e.g. contains more than about 15 carbon atoms, the neutralized alkyl aromatic sulfonic acid cannot be conveniently dispersed throughout the reaction mixture employed in production of the polyurethane foam and, hence, will fail to function in the desirable manner. In general, preferred neutralized alkyl aromatic sulfonic acids employed herein as a constituent in the novel catalyst composition of the present invention are derived from monoalkyl benzene sulfonic acids containing less than about 12 carbon atoms in the chain since such neutralized sulfonic acid salts may be prepared in the anhydrous state. The use of an anhydrous tertiary amine salt in alkylarylsulfonic acid provides additional advantages in polyurethane foam production since the density of the resultant foam may be precisely controlled in the absence of water.

Suitable alkylarylsulfonic acids which may be employed as starting materials in forming the alkylarylsulfonic acid tertiary amine salts may be exemplified by dodecylbenzene sulfonic acid
undecylbenzene sulfonic acid
nonylbenzene sulfonic acid
tridecylbenzene sulfonic acid
dodecylnaphthyl sulfonic acid
1,4-di-dodecylbenzene sulfonic acid
1,4-di-dodecylnaphthyl sulfonic acid
dodecylindane sulfonic acid
4,4'-dodecyldiphenyl sulfonic acid It is to be understood that either single isomers of the alkylarylsulfonic acids or mixtures thereof, as obtained, for example, from conventional alkylation procedures employed in production of alkylarylsulfonic acid surfactant compositions (i.e. mixtures of alkylarylsulfonic acids wherein the number of carbon atoms in the alkyl chain vary in length), are contemplated herein as intermediates in producing this constituent of the catalyst composition of the present invention. It is to be further understood that alkyl substituents of the alkylarylsulfonic acids contemplated herein may be straight or branched chain, i.e. the alkyl substituents may be attached to the aromatic nucleus at the terminal or any intermediary carbon atom of the alkyl chain.

In preparation of the tertiary ammonium salts of the alkylarylsulfonic acids of the present invention, the sulfonic acid is at least in part neutralized with an appropriate tertiary amine compound. Any suitable tertiary amine may be used including, for example, aliphatic, cycloaliphatic, araliphatic and like tertiary amines. In general, the tertiary amines employed herein may be substituted by linear or branched, aliphatic, cycloaliphatic or araliphatic hydrocarbon radicals which may also contain hetero atoms such as oxygen, sulphur or nitrogen. Specific examples of substituents attached to the nitrogen atom of the tertiary amine include, for example, methyl, ethyl, propyl, butyl, hexyl, octyl, lauryl, stearyl, cyclohexyl, benzyl, isopropyl, propenyl, butene-2-yl,

$(CH_3)_2$—N—$CH_2$—$CH_2$— and the like. Tertiary amines containing hydroxy groups as well as additional products of low or relatively high molecular weight obtained from primary and/or secondary monoamines or polyamines and alkyl oxides such as ethylene oxide, propylene oxide, 1,2-2,3-butylene oxide; styrene oxide, epichlorohydrin and the like may also be used. Illustrative examples of tertiary amines employable herein include triethylenediamine
triethylamine
dimethylbutylamine
dimethyl-(3-ethoxypropyl)amine
dimethylcyclohexyl amine
dimethylstearyl amine
diethylbutyl amine
tri-n-propyl amine
tri-n-butyl amine
tetramethylethylene diamine
tetramethyltetramethylene diamine
tetramethylhexylmethylene diamine
methyl morpholine
ethyl morpholine
dimethyl piperazine
N-methyl-N-(2-dimethylaminoethyl)-piperazine
pyridine
benzylpyridine
dimethylethanolamine
diethylethanolamine
N-methyl-diethanolamine
N-butyl-diethanolamine
triethanolamine Mixtures of the aforementioned and like amines are also contemplated herein. It is preferred, in accordance with the present invention, to employ as the tertiary ammonium alkylaryl sulfonic acid salt, a sulfonic acid which has been neutralized with a trialkyl amine in which the alkyl groups contain up to about 4 carbon atoms or such tertiary amines containing hydroxy groups, for example, triethylamine or triethanolamine.

The neutralization of an alkylarylsulfonic acid to form the tertiary ammonium salts employed as a constituent of the catalyst of the present invention may readily be effected in accordance with known techniques. Accordingly, these salts may be formed by mixing the alkylarylsulfonic acid with the tertiary amine in the anhydrous state, or the sulfonic acid may be dissolved or suspended in water and/or solvent such as in alcohol, illustratively, ethyl alcohol, heated under agitation to an elevated temperature, e.g. above about 40° C., and then further mixed with the tertiary amine used for neutralization purposes.

A surprising facet in the present invention resides in the fact that the relative proportions of the alkylarylsulfonic acids and the particular tertiary amines used need not be exactly the stoichiometric proportions required for the reaction. It is preferred that the stoichiometric amount of the sulfonic acid and the tertiary amine employed be used so that substantially all of the acid is effectively neutralized. It is considered that an excess over the stoichiometric amount required of the amine is not disadvantageous since in the ultimate catalyst the neutralized sulfonic acid is used in conjunction with at least one amine.

If not all of the sulfonic acid is neutralized, it is considered that the results achieved with the ultimate catalyst are not as beneficial as could be achieved otherwise since the sulfonic acid as such is not considered effective for the total purposes of this invention. In general, if unneutralized sulfonic acid is present, the greater the degree to which it is present the greater the loss in the desired properties of the ultimate catalyst mixture. For acceptable results it is presently considered that about at least 75% of the sulfonic acid should be neutralized, and preferably all of it should be neutralized.

The amine which is admixed with the neutralized sulfonic acid to form the catalyst composition of the present invention may be any of a series of well known amines. Such amine should be a liquid at normal ambient temperature so as to facilitate its use. In general, the amines contemplated herein for use in combination with the neutralized sulfonic acids are liquids at normal room temperatures, e.g. 25–30° C., and atmospheric pressure. Because of their low boiling points, this consideration renders less desirable the use of compounds such as methyl amine, diethyl amine, trimethyl amine, and like amines having low boiling points. Preferred results are achieved utilizing triethanolamine and triethylamine because of the effectiveness of these compounds as well as their availability. However, other related amines such as those above discussed with respect to the tertiary amines employed in formulating the neutralized sulfonic acid may be used as ingredients in formulating the catalyst composition in the present invention. For best results, it is preferred that the amine used be an aliphatic tertiary amine, although various primary and secondary amines corresponding to tertiary amines such as diethyl amine and ethylamine can be employed with less effectiveness. It is to be understood that mixtures of amines in formulating the compositions of the present invention are also contemplated.

The relative proportions of the amine and neutralized sulfonic acid which comprise the catalyst of the present invention can be varied over comparatively wide limits. Most effective results are obtained when about equal parts by weight of the neutralized sulfonic acid and of the particular amine or amines are employed as ingredients of the catalyst composition of the present invention. However, in order to attain the objects of the present invention and to achieve effective catalysis of the polyurethane foam forming reaction in accordance with the present invention, it is essential that the catalyst composition be comprised of at least about 10%, by weight, of one of these ingredients and the balance of the other. Preferably, the catalyst composition contains from about 25% to about 75%, by weight, of the aliphatic amine and from about 25% to about 75%, by weight, of the neutralized sulfonic acid. On the basis of work to the present time, it would appear that the further the proportions vary from an equal part by weight mixture the lesser the degree of effectiveness of the catalyst mixture. Hence, what may be considered to be a continuous variable situation is apparently involved with a catalyst of this invention.

The variation in the proportions of the ingredients in a catalyst mixture of this invention is considered to evidence the fact that in some unknown matter the effective ingredient in catalyst of this invention involves an unknown type of a complex formed between the two different types of ingredients used. This conclusion is also supported by the fact that neither the neutralized sulfonic acid nor an amine alone used in this invention produces the effective results of a catalyst mixture as specified herein in catalyzing polyurethane foam producing reactions. This is considered as evidence in the fact that with the present invention a synergistic type of effect is obtained.

This function of the catalyst as indicated as to control or regulate the reaction between the urethane producing ingredients so that a balance is achieved in promoting the desired linear polyurethane linkage forming isocyanate-reactive hydrogen reactions and the necessary isocyanate water reactions leading to the production of carbon dioxide gas at a rate such that known desirable foam characteristics are achieved. It is not considered necessary to discuss in this specification all of the various desirable properties which can and are obtained as a result of such balancing of reaction rates with the catalyst of this invention. These properties involve such characteristics as rebound, compression set, tear strength, elongation, tensile strength, atmospheric moisture resistance ("climate control"), porosity and the like.

The catalyst compositions of the present invention are employed in the same manner in which conventional catalysts are used for catalyzing the reaction between polyols and polyfunctional isocyanates. This reaction may be of the "one-shot" type where the ingredients are reacted and simultaneously foamed, or may be of the "two-stage" type which requires prior formation of a prepolymer.

Any of a wide variety of organic polyisocyanates may be employed as reactants with the polyol, including aromatic, aliphatic and cycloaliphatic polyisocyanates or mixtures thereof. Liquid diisocyanates are preferred. As examples of this component, the following are mentioned:

m-Phenylene diisocyanate
2,4-tolylene diisocyanate
2,6-tolylene diisocyanate
Naphthalene-1,5-diisocyanate
Naphthalene-1,8-diisocyanate
4,4'-methylene-bis-(phenylisocyanate)
4,4'-methylene-bis-(tolylisocyanate)
4,4'-methylene-bis-(cyclohexylisocyanate)
1,6-hexamethylene-diisocyanate.

A general discussion of isocyanates and their preparation may be found in Saunders et al., Polyurethanes, Chemistry and Technology, Part I, Chemistry, High Polymers, vol. XVI, Interscience Publishers 1962, pages 17–32. Crude polyisocyanate compositions, such as described in U.S. Pat. 3,316,286, as well as modified crude polyisocyanate compositions as disclosed in U.S. Pats. 3,341,462 and 3,359,295, are also contemplated.

The expression "polyfunctional compound containing an active hydrogen group," as used throughout this specification and claims, refers to polyester, polyether and polyether - polyester - polyols containing terminal hydroxy groups.

The catalyst compositions of the present invention are particularly suitable for use in reaction of organic polyisocyanates of the type above described with high molecular weight polyether polyols. The molecular weight of the polyether polyol can be from about 500 to about 5000. Examples of these polyether polyols include polyethylene ether glycol, 1,2- and 1,3- polypropylene ether glycol, 1,2-polydimethylethylene ether glycol, 1,4-polytetramethylene ether glycol, polydecamethylene ether glycol, as well as reaction products of alkylene oxides, such as propylene oxide, ethylene oxide and ethylene oxidepropylene oxide copolymers, with linear diols and higher polyols. Examples of linear diols referred to as reactants with one or more said alkylene oxides include ethylene glycol, propylene glycol, 2-ethylhexanediol-1,3 and examples of higher polyols include glycerol, trimethylolpropane, 1,2,6-hexanetriol, pentaerythritol and sorbitol.

Another class of polyether polyols are the so-called block copolymers having a continuous chain of one type of oxyalkylene linkage connected to blocks of another type of oxyalkylene linkage. Examples of such block copolymers are reaction products of polypropylene glycols having average molecular weights of 500 to 5000 with an amount of ethylene oxide equal to 5 to 25%, by weight, of the starting polypropylene glycol. Another class of such block copolymers is represented by the corresponding reaction products of propylene oxide with polyethylene glycols.

Among the polyesters which are suitable reactants for isocyanates are those having reactive hydrogen-containing terminal groups, preferably predominantly hydroxyl groups. Such polyesters include reaction products of low molecular weight aliphatic polyols containing from about two to ten carbon atoms, e.g. ethylene glycol, diethylene glycol, propylene glycol, neopentyl glycol, dipropylene glycol, glycerine, with polycarboxylic acids having from two to thirty-six carbon atoms, e.g. oxalic acid, succinic acid, maleic acid, adipic acid, sebacic acid, isosebacic acids, phthalic acids, and dimer acids such as those obtained by coupling two molecules of linoleic acid.

The polyurethane foam products are produced by reaction of the polyurethane forming reactants, i.e. the polyfunctional compound containing an active hydrogen group and the polyfunctional isocyanate. The amount of polyisocyanate used is that generally sufficient to react with the active hydrogen groups of the polyol used and with any other ingredients containing such active hydrogen groups present in the reaction mixture. This amount can be such as to provide a ratio of NCO:OH groups within the range of 0.9 to 1.5:1, the prefered NCO:OH ratio being about 1.0:1 to 1.2:1. The resulting reaction product is expanded with the blowing agent which generally is cabon dioxide formed from the reaction between excess polyisocyanate and water; or a gas formed by the volatilization of a readily liquefied gas propellant such as an alkane-substituted halogen gas (fluorinated hydrocarbons or mixtures thereof having one to four carbon atoms in the carbon chain) or a gas formed by the decomposition of a compound such as ammonium carbonate. The actual reaction conditions are to a large extent a matter of choice and the reaction temperature employed may vary from room temperature to as high as about 150° C. and above.

In accordance with what is now conventional practice for producing cellular urethane structures, the polyisocyanatepolyol mixture can be reacted in the presence of various adjuvants such as activators, dispersing agents or emulsifiers and the like.

Dispersing agents and/or emulsifiers conventionally used in this art include polyethylenephenolethers, blends of polyalcohol carboxylic acid esters, oil soluble sulfonates, siloxaneoxyalkylene block copolymers and the like. The preferred adjuvants of this group in the present instances are the siloxaneoxyalkylene block copolymers of the general formula:

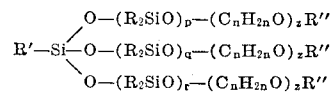

wherein R, R', and R" are $C_{1-18}$ alkyl radicals; $p$, $q$, and $r$ are integers from 2 to 13, and $—(C_nH_{2n}O)_z$ is a polyoxyalklane block which is preferably a polyoxyethylene block containing from 10 to 50 of each oxyalkylene unit. Products of this type are disclosed in U.S. Pat. 2,834,748 and Belgium Pats 582,362 and 582,363. Such siloxane-oxyalkylene block copolymers are available commercially, one such product being offered under the trade designation of "Silicone-L-520," in which above general formula: $R=CH_3$, $R'=C_2H_5$, $R''=C_4H_9$, $p=q=r=7$ and the block $—(C_nH_{2n}O)_z$ is a polyoxyethylene-polyoxypropylene block containing about 50 units of each polyoxyalkylene moiety. The catalyst of the present invention can, of course, be used along with other known conventional catalysts and/or activators conventionally employed for different purposes in forming polyurethane foams. Suitable such catalysts and/or activators include organo-tin compounds of the general formula:

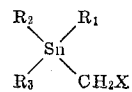

wherein CH₂X represents a hydrocarbon alkane radical of 1 to 18 carbons; $R_1$, $R_2$ and $R_3$ represent a hydrocarbon alkane radical of from 1 to 18 carbons, hydrogen, halogen, or a hydrocarbon aryloxy radicals, $R_1$, $R_2$ and $R_3$ being alike or different and further two members of the group of $R_1$, $R_2$ and $R_3$ together may be oxygen or sulfur. Representative members of this class of compounds include the following specific compounds:

tetramethyl tin
tetra-n-butyltin
tetraoctyltin
dimethyldioctyltin
di-n-butyltindichloride
dilauryltindifluoride
2-ethylhexyltintriiodide
di-n-octyltinoxide
di-n-butyltindiacetate
di-n-butyltin-bis-(monobutylmaleate)
di-2-ethylhexyltin-bis(2-ethylhexanoate)
tri-n-butyltin-acetonate
dibutyltindistearate Organic tin salts, such as stannous octoate and stannous oleate, constitute another class of tin compounds, normally employed as activators in polyurethane foam formation reactions.

It is to be considered quite significant that with the catalyst compositions of this invention, the amounts of ingredients such as silicones and organo-metallic salts aforementioned normally used with polyurethane foam forming ingredients may be considerably reduced.

The amount of novel catalyst composition of the present invention which should be employed in the polyurethane foam forming reaction will, of course, vary in accordance with a number of factors such as the nature of the precise polymer system used, the properties desired in the ultimate product, the temperature at which the foam is created, the humidity of the atmosphere at the time foam is made and the like. In general, the amount of such a catalyst will also vary to some degree with the nature of the catalyst used as well as whether secondary catalysts are employed.

It is considered that in compositions containing 100 parts by weight polyurethane forming ingredients the amount of the catalyst can be varied from about 0.05 to about 0.50 parts by weight in obtaining effective results. It is to be recognized that these figures are not considered as limiting the invention and that the amount of the catalyst for any specific formulation is best determined empirically. One advantage of the present invention is that a relatively small amount of catalyst is normally required for a specific application.

The following examples are illustrative of the present invention, but are not considered as limiting its scope in any manner whatever. In the examples, all figures are parts by weight.

EXAMPLE 1

Part A.—A neutralized sulfonic acid was prepared by mixing and subsequent heating in an appropriate container an alkylbenzene sulfonic acid in which the aliphatic chains were branched and had an average length of 11.5±0.5 in the amount of 100 parts by weight with 81.6 parts by weight water and 10.2 parts by weight ethyl alcohol. When this mixture under agitation reached 40° C., it was a dense, viscous compensation having a brown color. At this point 47.8 parts by weight triethanolamine were added while the mixture was agitated and the 40° C. temperature maintained. At the end of a 3-hour period, the viscosity of the mixture had decreased and it became a yellow-orange type color. After standing overnight at 40° C., the emulsion obtained by these operations had separated. From this product the neutralized sulfonic acid was obtained by decantation. This product had a rose brick color and the following analysis by weight: triethanolamine alkylbenzenesulfonate 60%; nonsulfonated alkylbenzene 0.6%; ethyl alcohol 4.2%; water 34.2%.

Part B.—50 parts by weight of the neutralized sulfonic acid obtained in the above manner (not counting the weight of the contaminants noted) was mixed with 50 parts by weight triethylamine, to form a catalyst of this invention.

EXAMPLE 2

75 parts by weight of the neutralized sulfonic acid as specified in Example 1 (not counting the weight of the contaminants noted) are mixed with 25 parts by weight triethylamine so as to form a catalyst of this invention.

EXAMPLE 3

25 parts by weight of the neutralized sulfonic acid as specified in Example 1 (not counting the weight of the contaminants noted) are mixed with 75 parts by weight triethylamine so as to form a catalyst of this invention.

EXAMPLE 4

50 parts by weight of the neutralized sulfonic acid as specified in Example 1 (not counting the weight of contaminants noted) are mixed with 50 parts by weight tri-n-propylamine so as to form a catalyst of this invention.

EXAMPLE 5

50 parts by weight of the neutralized sulfonic acid as specified in Example 1 (not counting the weight of contaminants noted) are mixed with 50 parts by weight dipropylmonoethylamine so as to form a catalyst of this invention.

EXAMPLE 6

A mixture of alkylbenzenesulfonic acid having aliphatic chains of about 9 to 15 carbon atoms is neutralized with diethanolmonopropanolamine following the procedure indicated in Example 1. 50 parts by weight of the neutralized acids (not counting the weight of contaminants present) from the neutralizing procedure are then mixed with 50 parts by weight triethanolamine so as to form a catalyst of this invention.

EXAMPLE 7

A mixture of alkylbenzenesulfonic acid having aliphatic chains of about 9 to 15 carbon atoms is neutralized with tripropanolamine following the procedure indicated in Example 1. 50 parts by weight of the neutralized acids (not counting the weight of contaminants present) from the neutralizing procedure are then mixed with 50 parts by weight triethanolamine so as to form a catalyst of this invention.

EXAMPLE 8

Part A.—To a reaction vessel equipped with a condenser, agitator and external cooling means there were charged 102 parts of ice-cold anhydrous triethylamine (industrial grade). While maintaining the reaction vessel contents at a temperature of between 10°–15° C., there were then charged with agitation about 200 parts of a linear alkylbenzenesulfonic acid (NACCONOL 98SA) characterized as follows:

TABLE I.—TYPICAL ANALYSIS OF THE LINEAR ALKYLATE USED FOR PREPARATION OF 97% ACTIVE ORGANIC SULFONIC ACID

| | 97% Nacconol 98SA |
|---|---|
| Carbon distribution [1]: | |
| C₉ | Nil |
| C₁₀ | 17% |
| C₁₁ | 43% |
| C₁₂ | 33% |
| C₁₃ | 6% |
| C₁₄ | 1% |
| >C₁₄ | Nil |
| Molecular weight | ca. 236 |
| 2-phenyl alkane content | 28% |
| Bromine number | <0.01 |
| Moisture | <0.01% |

[1] Analysis by gas liquid chromatograph.

The analysis of the linear alkylate used for preparation of said alkylbenzenesulfonic acid was as follows:

TABLE II

Typical analysis and property data for high active linear alkylate sulfonic acid Typical analysis: NACCONOL 98SA

| | |
|---|---|
| Linear alkylate sulfonic acid, percent | 97.0 |
| Sulfuric acid, percent | 1.6 |
| Total acidity (as $H_2SO_4$), percent | 16.4 |
| Water, percent | 0.1 |
| Free oil (glycol method), percent | 1.3 |
| Acid number, mg. KOH/g. | 188 |

Physical properties:

| | |
|---|---|
| Specific gravity, 25°/25° C. | 1.056 |
| Density, 25° C., lbs./gal. | 8.79 |
| pH (1% aqueous solution) | 2.7 |
| Viscosity, 25° C., cps. | 1600 |
| Pour Point (ASTM D–97–IP–15, Method B), ° F. | <10 |

The temperature of the reaction vessel contents was permitted to increase up to about 25° C. to reduce the viscosity thereof. Thereafter, additional linear alkylbenzenesulfonic acid was added so that a total of 318 parts of alkylbenzenesulfonic acid were charged, the total time for addition of all of the alkylbenzenesulfonic acid being about 4 hours; the pH of the resultant reaction mass was about 3. After additional triethylamine (10 parts) were charged to neutralize the reaction mass to a neutral pH, the reaction mass was heated to a temperature between 35°–40° C. The resulting essentially anhydrous triethylamine linear alkylbenzenesulfonate product was a clear, viscous, amber liquid.

On cooling, the sulfonate solidified to give stiff gel. Subsequent dilution of the sulfonate with water (275 parts) to a solids concentration of about 60% resulted in 705 parts of product solution which was comprised of about 59.2% triethylamine alkylarylsulfonate.

Part B.—The neutralized sulfonic acid obtained in the above manner is mixed with an equivalent amount, by weight, of triethylamine to form a typical catalyst composition of the present invention.

EXAMPLES 9–10

The components indicated in Table III below were combined with 50.2 parts of a mixture of 80 parts 2,4- and 20 parts 2,6-tolylene diisocyanate in a conventional urethane slab stock machine operating at the rate of 110 lbs./min. The resultant NCO/OH index for each of the formulations was 1.06.

TABLE III

| Component formulation | Parts by weight | |
|---|---|---|
| | Example 10 | Example 11 |
| Polyol, 3,000 mol. wt. triol (Dow CP 3000) | 100 | 100 |
| Water | 4.0 | 4.0 |
| Catalyst of Example 1 [1] | 0.15 | |
| Catalyst of Example 9 [1] | | 0.15 |
| Silicone (DC-190) | 1.20 | 1.20 |
| Stannous octoate | 0.27 | 0.27 |

[1] Free of contaminants.

The physical properties of the resultant urethane foam structures are given in Table IV below.

TABLE IV

| Physical property | Parts by weight | |
|---|---|---|
| | Example 10 | Example 11 |
| Density | 1.41 | 1.44 |
| Tensile | 18 | 18 |
| Elongation | 260 | 260 |
| Tear strength | 2.7 | 2.7 |
| Compression set, 90% | 4.8 | 7.0 |
| Ball rebound | 39 | 35 |
| Indentation load deflection, 25% | 45 | 44.5 |
| ILD spread | 5 | 5 |
| Air flow | 3.5 | 3.8 |

The above results demonstrate the obtainment of desirable physical properties of cellular polyurethane foams by use of the catalyst compositions of the present invention. In addition, the catalyst compositions of the present invention provided the necessary fast reaction rate required by slab stock machines while use of alkylbenzenesulfonates alone results in a relatively slow reaction rate which is unacceptable in commercial practice using such machines.

Many modifications and variations of the present invention as hereinabove set forth may be made without departing from the spirit and scope thereof.

We claim:
1. A catalyst composition useful in the production of polyurethane foams comprising a mixture of (a) from about 10% to about 90%, based on the weight of said mixture of an aliphatic tertiary amine compound and (b) from about 90% to about 10%, by weight, of said mixture of an alkylarylsulfonic acid tertiary amine salt containing from about 9 to 15 carbon atoms in the alkyl chain.

2. The catalyst composition of claim 1 wherein said amine salt is an aliphatic tertiary amine salt of an alkylarylsulfonic acid.

3. The catalyst composition of claim 1 wherein said amine salt is a hydroxy-substituted aliphatic tertiary amine salt of an alkylarylsulfonic acid.

4. The catalyst composition of claim 1 wherein said tertiary amine compound is an aliphatic hydrocarbon amine.

5. The catalyst composition of claim 1 wherein said tertiary amine compound is triethylamine.

6. The catalyst composition of claim 1 wherein said mixture contains from about 25% to about 75%, by weight, of said tertiary amine compound and from about 75% to about 25%, by weight, of said alkylarylsulfonic acid tertiary amine salt.

7. The catalyst composition of claim 6 wherein said amine salt is an aliphatic tertiary amine salt of an alkylbenzenesulfonic acid.

8. The catalyst composition of claim 6 wherein said amine salt is a trialkyl amine salt of an alkylbenzenesulfonic acid.

9. The catalyst composition of claim 8 wherein said trialkyl amine salt is a triethylamine salt.

10. The catalyst composition of claim 6 wherein said amine salt is a hydroxy-substituted aliphatic tertiary amine salt of an alkylbenzenesulfonic acid.

11. The catalyst composition of claim 10 wherein said hydroxy-substituted aliphatic tertiary amine salt is a triethanolamine salt.

12. The catalyst composition of claim 9 wherein the alkyl substituent of the alkylbenzenesulfonic acid amine salt contains an average of between about 11 and 12 carbon atoms.

13. The catalyst composition of claim 11 wherein the alkyl substituent of the alkylbenzenesulfonic acid amine salt contains an average of between about 11 and 12 carbon atoms.

14. The catalyst composition of claim 1 wherein said mixture contains about 50%, by weight, of triethylamine and about 50%, by weight, of a triethylamine salt of an alkylbenzenesulfonic acid containing an average of between about 11 and 12 carbon atoms in the alkyl chain.

15. The catalyst composition of claim 1 wherein said mixture contains about 50%, by weight, of triethylamine and about 50%, by weight, of a triethanolamine salt of an alkylbenzenesulfonic acid containing an average of between about 11 and 12 carbon atoms in the alkyl chain.

16. A process for producing polyurethane foams comprising admixing at least one polyfunctional isocyanate compound with at least one polyfunctional compound containing an active hydrogen group in the presence of a catalyst composition comprising a mixture of (a) from about 10% to about 90%, based on the weight of said mixture of an aliphatic tertiary amine compound and (b) from about 90% to about 10%, by weight, of said mixture of an alkylarylsulfonic acid tertiary amine salt containing from about 9 to 15 carbon atoms in the alkyl chain and in the presence of a blowing agent.

17. The process of claim 16 wherein said catalyst composition contains from about 25% to about 75%, by weight, of said tertiary amine compound and from about 75% to about 25%, by weight, of said tertiary amine salt.

18. The process of claim 17 wherein said tertiary amine is an aliphatic hydrocarbon amine compound and said tertiary amine salt is an aliphatic tertiary amine salt.

19. The process of claim 17 wherein said tertiary amine is an aliphatic hydrocarbon amine compound and said tertiary amine salt is a hydroxy-substituted aliphatic tertiary amine salt.

20. The process of claim 18 wherein said catalyst composition is comprised of a mixture of triethylamine and a triethylamine salt of an alkylbenzenesulfonic acid containing an average of between about 11 and 12 carbon atoms in the alkyl chain attached to the benzene nucleus.

21. The process of claim 18 wherein said catalyst composition is comprised of a mixture of triethylamine and a triethanolamine salt of an alkylbenzenesulfonic acid containing an average of between about 11 and 12 carbon atoms in the alkyl chain attached to the benzene nucleus.

22. A urethane foam prepared by a process comprising admixing at least one polyfunctional isocyanate compound with at least one polyfunctional compound containing an active hydrogen group in the presence of a catalyst composition comprising a mixture of (a) from about 10% to about 90%, based on the weight of said mixture of an aliphatic tertiary amine compound and (b) from about 90% to about 10%, by weight, of said mixture of an alkylarylsulfonic acid tertiary amine salt containing from about 9 to 15 carbon atoms in the alkyl chain and in the presence of a blowing agent.

23. A urethane foam as defined in claim 22 wherein said catalyst composition contains from about 25% to about 75%, by weight, of said tertiary amine compound and from about 75% to about 25%, by weight, of said tertiary amine salt.

24. A process for producing polyurethane foams comprising admixing at least one polyfunctional isocyanate compound with at least one polyfunctional compound containing an active hydrogen group in the presence of a catalyst composition comprising a tin catalyst, and a mixture of (a) from about 10% to about 90%, based on the weight of said mixture of an aliphatic tertiary amine compound, and
(b) from about 90% to 10%, by weight of said mixture, of an alkylarylsulfonic acid tertiary amine salt containing from about 9 to 15 carbon atoms in the alkyl chain, and in the presence of a blowing agent.

25. The process of claim 24 wherein said tin catalyst is selected from the group consisting of organo tin compounds and organic tin salts.

26. The process of claim 24 wherein said tin catalyst is stannous octoate.

27. The process of claim 24 wherein said mixture contains from about 25% to about 75% by weight of said aliphatic tertiary amine compound and from about 75% to about 25% by weight of said tertiary amine salt.

28. The process of claim 26 wherein said aliphatic tertiary amine compound is an aliphatic hydrocarbon amine compound and said tertiary amine salt is an aliphatic tertiary amine salt.

29. The process of claim 26 wherein said aliphatic tertiary amine compound is an aliphatic hydrocarbon amine compound and said tertiary amine salt is a hydroxy-substituted aliphatic tertiary amine salt.

30. A urethane foam prepared by a process comprising admixing at least one polyfunctional isocyanate compound with at least one polyfunctional compound containing an active hydrogen group in the presence of a catalyst composition comprising a tin catalyst and a mixture of (a) from about 10% to 90% based on the weight of said mixture of an aliphatic tertiary amine compound, and
(b) from about 90% to about 10%, by weight of said mixture, of an alkylarylsulfonic acid tertiary amine salt containing from about 9 to 15 carbon atoms in the alkyl chain, and in the presence of a blowing agent.

31. A urethane foam as defined in claim 30 wherein said tin catalyst is selected from the group consisting of organo-tin compounds and organic tin salts.

32. A urethane foam as defined in claim 31 wherein said tin catalyst is stannous octoate.

33. A urethane foam as defined in claim 30 wherein said mixture contains from about 25% to about 75% by weight of said aliphatic tertiary amine compound and from about 75% to about 25% by weight, of said tertiary amine salt.

References Cited

FOREIGN PATENTS

| 839,185 | 6/1960 | Great Britain | 260—2.5 AC |
| 844,525 | 8/1960 | Great Britain | 260—2.5 AC |

OTHER REFERENCES

Saunders et al., Polyurethanes, Part I, Interscience, N.Y. 1962, pp. 227–232.

DONALD E. CZAJA, Primary Examiner

M. J. WELSH, Assistant Examiner

U.S. Cl. X.R.

252—182, 426; 260—75 NC, 77.5 AC